(12) United States Patent
Chou et al.

(10) Patent No.: US 9,775,087 B2
(45) Date of Patent: Sep. 26, 2017

(54) METHOD OF CONTROLLING COMMUNICATION MODES FOR WIRELESS ENTITY AND USER EQUIPMENT, AND COMMUNICATION SYSTEM USING THE SAME

(71) Applicant: Industrial Technology Research Institute, Hsinchu (TW)

(72) Inventors: Chie-Ming Chou, Hsinchu County (TW); Chun-Chia Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 167 days.

(21) Appl. No.: 14/754,715

(22) Filed: Jun. 30, 2015

(65) Prior Publication Data

US 2016/0119846 A1     Apr. 28, 2016

Related U.S. Application Data

(60) Provisional application No. 62/067,451, filed on Oct. 23, 2014.

(51) Int. Cl.
*H04W 36/22* (2009.01)
*H04W 16/14* (2009.01)
(Continued)

(52) U.S. Cl.
CPC ........... *H04W 36/22* (2013.01); *H04W 16/14* (2013.01); *H04W 72/0486* (2013.01);
(Continued)

(58) Field of Classification Search
CPC . H04W 36/22; H04W 16/14; H04W 72/0486; H04W 72/082
(Continued)

(56) References Cited

U.S. PATENT DOCUMENTS 8,290,503 B2    10/2012   Sadek et al.
8,767,576 B2     7/2014   Aguirre et al.
(Continued)

FOREIGN PATENT DOCUMENTS

| CN | 102450050  | 5/2012  |
| TW | I418180    | 12/2013 |
| WO | 2013179095 | 12/2013 |

OTHER PUBLICATIONS

"Office Action of Taiwan Counterpart Application," dated Jul. 21, 2016, p. 1-p. 6.
(Continued)

*Primary Examiner* — Ronald B Abelson
(74) *Attorney, Agent, or Firm* — Jianq Chyun IP Office

(57) ABSTRACT

A method of controlling communication modes for a wireless entity and a user equipment (UE), and a communication system using the same method. In one of the exemplary embodiments, the disclosure is directed to a method of controlling communication modes used by a wireless entity. The method would include not limited to receiving traffic loading information of a licensed spectrum used by a cellular network, detecting an interference situation of an unlicensed spectrum, selecting an operating mode from the communication modes according to the traffic loading information and the interference situation, and operating at the selected operating mode on the unlicensed spectrum.

26 Claims, 9 Drawing Sheets

(51) Int. Cl.
H04W 72/04 (2009.01)
H04W 72/08 (2009.01)
H04W 28/08 (2009.01)
H04W 84/04 (2009.01)
H04W 84/12 (2009.01)
H04W 88/06 (2009.01)
H04W 74/08 (2009.01)

(52) U.S. Cl.
CPC .......... H04W 72/082 (2013.01); *H04W 28/08* (2013.01); *H04W 72/0453* (2013.01); *H04W 74/0808* (2013.01); *H04W 84/042* (2013.01); *H04W 84/12* (2013.01); *H04W 88/06* (2013.01)

(58) Field of Classification Search
USPC .......................................................... 370/331
See application file for complete search history.

(56) References Cited

U.S. PATENT DOCUMENTS

| | | |
|---|---|---|
| 2012/0120892 A1 | 5/2012 | Freda et al. |
| 2013/0196653 A1 | 8/2013 | Morrison |
| 2014/0029535 A1 | 1/2014 | Medapalli |
| 2014/0187287 A1 | 7/2014 | Medapalli |
| 2014/0213219 A1 | 7/2014 | Mohebbi |
| 2014/0369329 A1 | 12/2014 | Lee et al. |
| 2015/0009850 A1 | 1/2015 | Chen et al. |
| 2015/0063323 A1 | 3/2015 | Sadek et al. |

OTHER PUBLICATIONS

"Extending LTE Advanced to unlicensed spectrum," Qualcomm Technologies, Inc., Qualcomm White Paper, Dec. 2013.

"Qualcomm Research LTE in Unlicensed Spectrum: Harmonious Coexistence with Wi-Fi," Qualcomm Technologies, Inc., Qualcomm White Paper, Mar. 2014.

"Overview of possible LAA impact to RAN2," Nokia Corporation, Nokia Networks, 3GPP TSG-RAN WG2 Meeting #89, R2-150188, Athens, Greece, Feb. 9-13, 2015.

"Initial overview of RAN2 impact due to LAA," Ericsson, 3GPP TSG-RAN WG2 #89, Tdoc R2-150383, Athens, Greece, Feb. 9-13, 2015.

"Potential RAN2 impacts of licensed assisted access (LAA)," Samsung, 3GPP TSG-RAN2 Meeting #89, R2-150235, Athens, Greece, Feb. 9-13, 2015.

"Required functionality for support of LAA-LTE," Qualcomm Incorporated, 3GPP TSG-RAN WG2 Meeting #89, R2-150517, Athens, Greece, Feb. 9-13, 2015.

METHOD OF CONTROLLING COMMUNICATION MODES FOR WIRELESS ENTITY AND USER EQUIPMENT, AND COMMUNICATION SYSTEM USING THE SAME

CROSS REFERENCE TO RELATED APPLICATION

This application claims the priority benefit of U.S. provisional application Ser. No. 62/067,451, filed on Oct. 23, 2014. The entirety of the above-mentioned patent application is hereby incorporated by reference herein and made a part of specification.

BACKGROUND OF THE DISCLOSURE

1. Field of the Disclosure

The present disclosure generally relates to a method of controlling communication modes for a wireless entity and a user equipment, and a communication system using the same method.

2. Description of Related Art

Recently, deploying more small cells such as Pico cell, Remote Radio Header and etc. and utilizing all spectrum resources are keys to meet the anticipated 1000× system capacity for satisfying the increase of data traffic. Although licensed spectrum is the foundation, bandwidth-rich unlicensed spectrum around 5 GHz band can be used to effectively augment the system capacity. Bringing Long Term Evolution (LTE) Advanced to unlicensed spectrum could be an idea with immense benefits as it involves leveraging large number of small cells that operators may plan to deploy and aggregating unlicensed spectrum with the licensed spectrum for LTE Advanced. The existing core network can be used without significant modifications. In essence, the whole system may work as a unified LTE network to efficiently leverage both licensed and unlicensed spectrum bands. To implement such idea, a Studying Group has been initiated at the 3GPP standard organization to discuss potential uses of the integration between LTE and unlicensed LTE. From an operator perspective, a unified air-interface of LTE over the licensed and unlicensed band is attractive because of unified authentication and security management, service quality guarantee, Operations support systems (OSS) and radio resource management, etc. Furthermore, a close coupling of small cells operating on the unlicensed spectrum with licensed macro-cells could simplify joint operations of both spectrum types. It is also noted that the macro-cells could provide licensed LTE and unlicensed LTE without any small cell's cooperation. From the user perspective, the joint operations may bring about an enhanced broadband experience which includes higher data rates, seamless use of both licensed and unlicensed bands, higher reliability, better mobility, and more.

One promising solution for LTE over Unlicensed spectrum (LTE-U) under regulations is the operator-controlled non-standalone deployment of LTE-U. The non-standalone LTE-U as depicted in FIG. 1 represents licensed spectrum and unlicensed spectrum were aggregated to provide transmission to the user equipment (UE). The licensed spectrum will serve as primary component carrier (PCC) whereas mobility management, Radio Resource Control (RRC) signaling, and scheduling results would be transmitted over that carrier. Alternatively, unlicensed spectrum serves as secondary component carrier (SCC) whereas the carrier would be used for transmitting some particular data. Under non-standalone LTE-U, the above problems would be simplified since control signaling are available and reliable on PCC and the remaining problems are how to decide when to activate the SCC on unlicensed spectrum. Notice that it is also possible to provide control signaling on SCC (i.e., LTE-U), but eNB shall guarantee the reliability and shall notify UE the corresponding operation.

After introducing LTE-U, an operator could either deploy a Wi-Fi access point (AP) or a LTE-U small cell to provide traffic offloading with Macro cell (operated at licensed spectrum). Unfortunately, those two Radio Access Technologies (RATs) might contention with each other if the operator deploys both of them in a particular area upon the same unlicensed spectrum and consequently, the performance might be degraded. Therefore, it requires a coordination mechanism or a new architecture to let the operator could utilize the unlicensed spectrum in efficient way.

SUMMARY OF THE DISCLOSURE

Accordingly, the present disclosure is directed to a method of controlling communication modes for a wireless entity and a user equipment (UE), and a communication system using the same method.

In one of the exemplary embodiments, the disclosure is directed to a method of controlling communication modes used by a wireless entity. The method would include not limited to receiving traffic loading information of a licensed spectrum used by a cellular network, detecting an interference situation of an unlicensed spectrum, selecting an operating mode from the communication modes according to the traffic loading information and the interference situation, and operating at the selected operating mode on the unlicensed spectrum.

In one of the exemplary embodiments, the disclosure is directed to a method of controlling communication modes used by a UE. The method would include not limited to receiving a signal command, wherein the signal command indicates an operating mode of using a cellular network and a wireless local network, and transmitting and receiving on an unlicensed spectrum using the cellular network or the wireless local network according to the signal command in response to receiving the signal command.

In one of the exemplary embodiments, the disclosure is directed to a communication system. The communication system would include not limited to a UE, a base station, and a wireless entity. The wireless entity would perform not limited to receiving a traffic loading information of a licensed spectrum of the base station using a cellular network, detecting an interference situation of an unlicensed spectrum, selecting an operating mode from communication modes according to the traffic loading information and the interference situation, and operating at the selected operating mode on the unlicensed spectrum. The UE would perform not limited to transmitting and receiving on the unlicensed spectrum using the cellular network or the wireless local network according to a signal command corresponding to the operating mode received from the base station.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
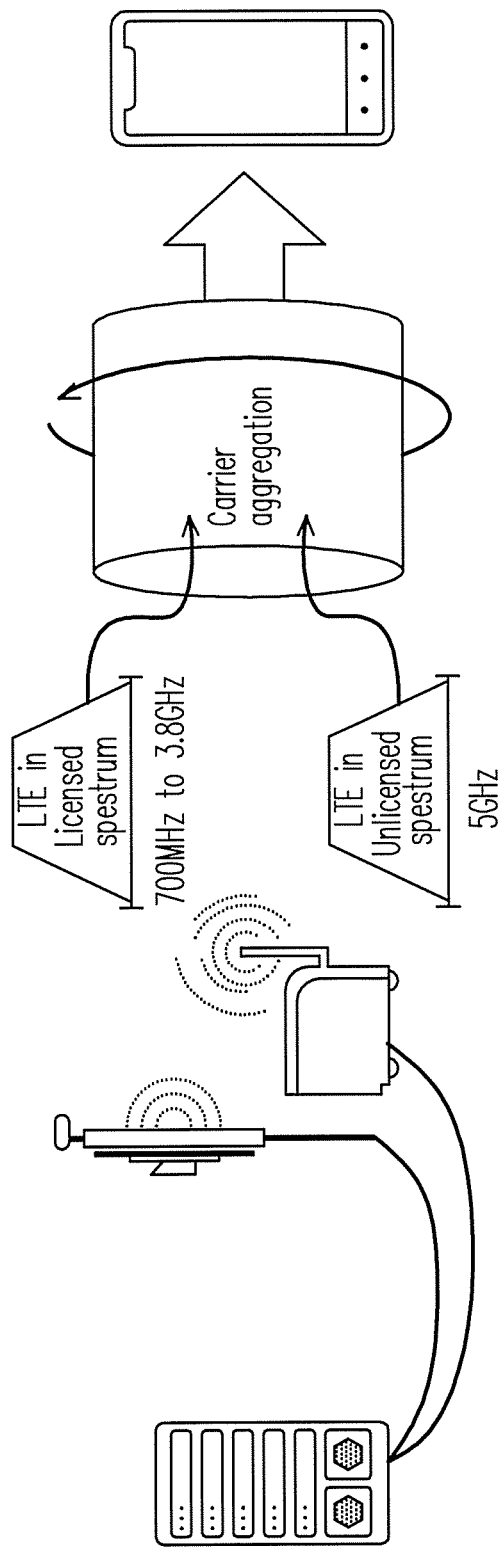
FIG. 1 is an example of a non-standalone LTE-U.

Reference will now be made in detail to the present preferred embodiments of the disclosure, examples of which are illustrated in the accompanying drawings. Wherever possible, the same reference numbers are used in the drawings and the description to refer to the same or like parts.

With explosive growth of wireless services and increasing demand for high data rates, it is imperative to enhance system capacity in cost-efficient way. To employ unlicensed frequency band (mainly in 5 GHz for example) as a secondary component carrier for data transmission in LTE system is a desirable solution since the operator could share the spectrum with other operators and other RATs without any licensing cost. However, there are existing wireless technologies such as 802.11 ac operating at the same spectrum and corresponding Wi-Fi AP would be another deployment candidate for operator to serve its users. From operator perspective, it is not clear how to utilize the spectrum by either deploying Wi-Fi AP or deploying LTE advanced in unlicensed bands. In this disclosure, it is defined multiple communication modes upon unlicensed spectrum and provide a method that operator could utilize the unlicensed spectrum by selectively turning on/off the communication modes of using a cellular network such as LTE and a wireless local network such as Wi-Fi based on observing traffic loading information of a licensed spectrum and interference situation of the unlicensed spectrum. With the proposed method and structure, operator could enlarge its capacity to satisfy the traffic requirements or eliminate the power consumption to save its operating cost.

In general, Wi-Fi AP was investigated that less power consumption and control overheads were required while it is operating. Due to Carrier Sense Multiple Access with Collision Avoidance (CSMA-CA) feature, the throughput/capacity would be reduced when there are a lot of contention users. Oppositely, LTE-U expects to have sufficient interference management to overcome crowded use upon unlicensed spectrum but more control signaling and power consumption needs to pay. It observes Wi-Fi and LTE-U having respective advantages and disadvantages for their operations and it is better to integrate/coordinate them for creating win-win performance from operator point of view. Meanwhile, legacy UE (without supporting LTE-U) may not be offloaded to LTE-U and Wi-Fi offloading is the only way to eliminate the heavy loading in Macro cell. How to ensure legacy support as well as utilize the unlicensed spectrum is important.

In this disclosure, it is assumed that an operator may deploy two different RATs (such as LTE-U and Wi-Fi) for the same region. But, the different RATs may not operate simultaneously due to the contention from each other at the same unlicensed spectrum. In order to utilize the resource on the unlicensed spectrum, an easy solution is trying to coordinate with each other by some specifying rules (e.g., separate time/frequency) to prevent the contention. However, it is hard to guarantee the coordination between LTE-U and Wi-Fi could success because entities deployed by other operators may try to join the resource contention. For example, operator A's LTE-U mutes its transmission at T1 in order to allow operator A's Wi-Fi transmission; but operator B's LTE-U may continue the transmission as well at T1 and make contention with operator A's Wi-Fi. Therefore, it would be better for operator to operate one RAT at a specific region to utilize the unlicensed spectrum. The remaining problem is how the operator decides to operate LTE-U or Wi-Fi at that region. In general, the selection may affect the performance since LTE-U and Wi-Fi use different protocols to deal with the sharing on the unlicensed spectrum. To optimize the performance, the present disclosure proposes a wireless entity co-located LTE-U and Wi-Fi (denoted by CLW) with adaptive ON/OFF mechanism (the wireless entity could operate with different communication modes).

Figure 2:
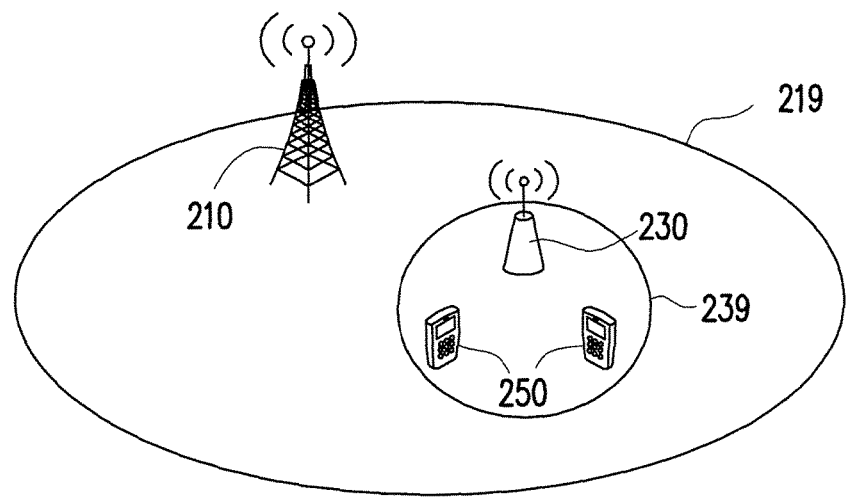
FIG. 2 is a schematic diagram illustrating a communication system in accordance with an embodiment of the present disclosure.

FIG. 2 is a schematic diagram illustrating a communication system in accordance with an embodiment of the present disclosure. Referring to FIG. 2, the communication system 200 could include but not limited to a base station (BS) 210, a wireless entity 230, and UEs 250. It is assumed that UEs 250 is located within service coverage area 219 of the BS 210 and service coverage area 239 of the wireless entity 230. It should be noticed that, there may be more than one wireless entity 230, more than two UEs 250, or only one UE 250 in the communication system 200, and the present disclosure is not limited to the numbers of the wireless entities 230 and the UEs 250.

The BS 210 may have various implementations, which includes (but is not limited to) a macro cell, an evolved node B (eNB), an advanced base station (ABS), a base transceiver system (BTS), an access point, a home base station, a relay, a scatter, a repeater, an intermediate node, an intermediary and/or satellite-based communication base stations.

Figure 3:
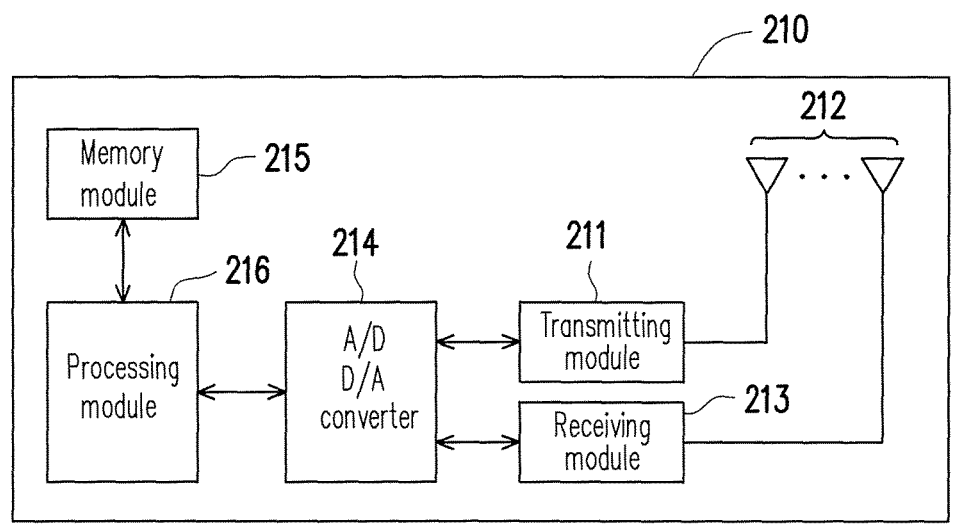
FIG. 3 is a block diagram of the BS in accordance with an embodiment of the present disclosure.

FIG. 3 is a block diagram of the BS 210 in accordance with an embodiment of the present disclosure. The BS 210 can be composed of functional devices shown in FIG. 3. The BS 210 may at least include (but is not limited to) a transmitting module 211, a receiving module 213, an analog-to-digital (A/D)/digital-to-analog (D/A) converter 214, a processing module 216, optionally a memory module 215, and one or more antenna units 212. The transmitting module 211 transmits downlink signals wirelessly, and the receiving module 213 receives uplink signals wirelessly. The transmitting module 211 and the receiving module 213 may also execute operations such as low noise amplification, impedance matching, frequency mixing, frequency up-conversion or frequency down-conversion, filtering, amplifying, or the like. The analog-to-digital (AD)/digital-to-analog (D/C) converter 214 is configured to convert a signal from an analog signal format to a digital signal format during an uplink signal processing period, and convert a signal from the digital signal format to the analog signal format during a downlink signal processing period.

The processor 216 is configured to process digital signal and to execute a procedure of the exemplary embodiment of the invention. Moreover, the processor 216 can be coupled to the storage unit 215 to store program codes, a device configuration, a codebook, buffer or permanent data, preference statistics of the UEs 250, or record a plurality of modules executed by the processor 216. The functions of the processor 216 can be implemented by using programmable units such as a microprocessor, a micro controller, a digital signal processing (DSP) chip, a field programmable gate array (FPGA), etc. The functions of the processor 216 can also be implemented by an independent electronic device or an integrated circuit (IC), and the processor 216 can also be implemented by hardware or software.

The wireless entity 230 may have various implementations, which includes (but is not limited to) a small cell, a CLW entity, a Home eNB, a Remote Radio Head (RRH), an advanced base station (ABS), a base transceiver system (BTS), an access point, a home base station, a relay, a scatter, a repeater, an intermediate node, an intermediary and/or satellite-based communication base stations.

Figure 4:
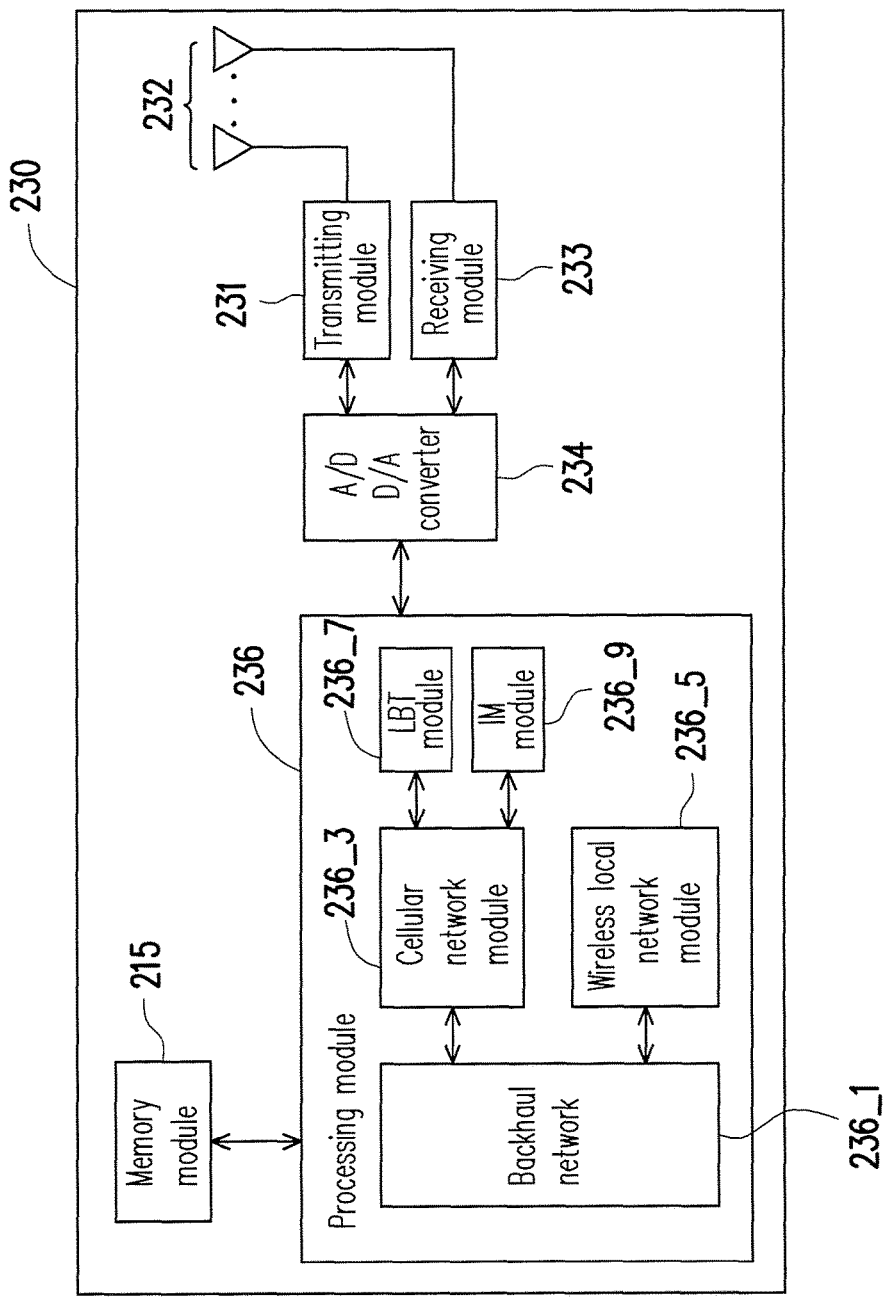
FIG. 4 is a block diagram of the wireless entity in accordance with an embodiment of the present disclosure.

FIG. 4 is a block diagram of the wireless entity 230 in accordance with an embodiment of the present disclosure. The wireless entity 230 may at least include (but is not limited to) a transmitting module 231, a receiving module 233, an analog-to-digital (AD)/digital-to-analog (D/C) 234, a processing module 236, a memory module 235 selectively configured according to an actual situation, and one or a plurality of antenna units 232. The processing module 236 can be implemented by hardware or software. Description of the functions of various components of the wireless entity 230 is similar to the description of the BS 210, and therefore details thereof are not repeated. The difference between the BS 210 and the wireless entity 230 is, the processing module 236 of the wireless entity 230 may further include but is not limited to a backhaul module 236_1, a cellular network module 236_3, a wireless local network module 236_5, Listen-before-Talk (LBT) module 236_7, and an interference mitigating (IM) module 236_9.

The backhaul module 236_1, the cellular network module 236_3, the wireless local network module 236_5, LBT module 236_7, and the IM module 236_9 could be independent from or an inherent part of the processing module 236, respectively, and also could be implemented by hardware or software.

The backhaul module 236_1 may be a wired or a wireless connection interface connected with a base station or a macro cell such as BS 210 or a core network such as GPRS core network, 3G CN, or 4G CN such as Evolved Packet Core (EPC) through optical fiber, twisted pair, coaxial cable, or microwave. The backhaul module 236_1 may be used for providing Internet Protocol (IP) access, a network negotiation, an interface with control/data signaling exchange and a bearer management (such as dealing with application Quality of Service (QoS)).

The cellular network module 236_3 may be for example a LTE chip which would support LTE-U. That means the cellular network module 236_3 would convert a digital message into a format that is compatible with LTE-U protocol. In the embodiments of the present disclosure, the cellular network module 2363 would be a LTE-U cell if the cellular network module 236_3 is turned on by the processing module 236_6. In some examples, the cellular network module 236_3 may further support at least one or a combination of other cellular Radio Access Technology (RAT) such as Global System for Mobile (GSM), Wideband Code Division Multiple Access (WCDMA), Code Division Multiple Access (CDMA) 2000, LTE, and etc.

The wireless local network module 236_5 may be for example a Wi-Fi chip which would support 802.11ac. That means the wireless local network module 236_5 would convert a digital message into a format that is compatible with 802.11 ac protocol. In the embodiments of present disclosure, the wireless local network module 236_5 would be a Wi-Fi AP if the wireless local network module 236_5 is turned on by the processing module 236_6. In some examples, the wireless local network module 236_5 may further support at least one or a combination of other wireless local network based RAT such as 802.11n, 802.11g, 802.11a, and etc.

The LBT module 236_7 would perform a contention-based mechanism such as listen before talk operating procedure which is consistent with IEEE 802.11 or the worldwide regulations. The LBT module 236_7 would be requested by the cellular network module 236_3 to measure unlicensed spectrum and evaluate whether the unlicensed spectrum is available. For example, a detected energy is smaller than a defined threshold.

The IM module 236_9 would perform at least one of interference mitigating mechanisms such as a power control mechanism, a time division mechanism, a frequency division mechanism, and a dynamic frequency hopping mechanism. In the power control mechanism, the wireless entity 230 may use small transmission power, and the BS 210 would need to inform the UEs 250 of the transmission power of the wireless entity 230. In the time division mechanism, the wireless entity 230 may perform data transmission at particular time, and the BS 210 would need to inform the UEs 250 what time pattern that the wireless entity 230 makes transmission to assist reference signaling measurement. In the frequency division mechanism, the wireless entity 230 may select a particular band for its operation, and the BS 210 would need to indicate the band information to avoid the UEs 250 performing blind search on the overall spectrum. In the dynamic frequency hopping mechanism, the wireless entity 230 may dynamically change the operating band to avoid interference, and the BS 210 would need to inform the UEs 250 of the hopping rules. However, it is apparent for an ordinary person skilled in the art that the IM module 236_9 could also be implemented in other types of interference mitigating mechanisms, and the present disclosure is not limited to the specific types of interference mitigating mechanisms.

In addition, the processing module 256 may decide which one of the cellular network module 236_3 and the wireless local network module 236_5 shall be turn ON or OFF, and provide negotiation between the cellular network module 236_3 and the wireless local network module 236_5. The transmitting module 231, the receiving module 233, and the antenna units 232 may be operated at unlicensed band such as 5 GHz, 2.4 GHz and/or other industrial, scientific and medical (ISM) radio bands.

The term "user equipment" (UE) such as UEs 250 in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, the UEs 250 may be a fixed computer device operating in a mobile environment, such as a bus, train, an airplane, a boat, a car, and so forth.

Figure 5:
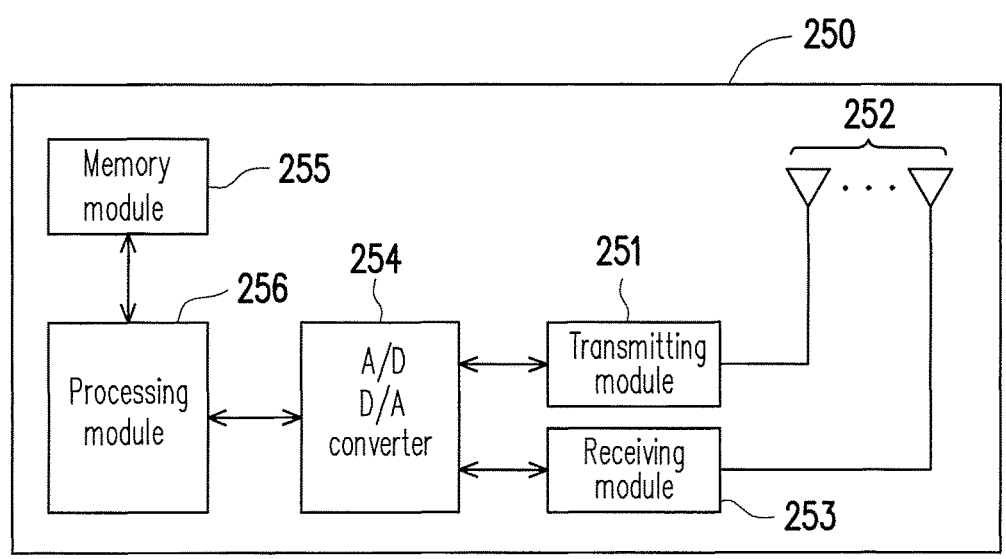
FIG. 5 is a block diagram of the UE in accordance with an embodiment of the present disclosure.

The UEs 250 may be represented by at least the functional elements as illustrated in FIG. 5 in accordance with an embodiment of the present disclosure. The UEs 250 may contain at least but not limited to a transmitting module 251, a receiving module 253, an analog-to-digital (A/D)/digital-to-analog (D/A) converter 254, a processing module 256, optionally a memory module 255, and one or more antenna units 252. The transmitting module 251 transmits downlink signals wirelessly, and the receiving module 253 receives uplink signals wirelessly. The transmitting module 251 and the receiving module 253 may also perform operations such as low noise amplifying, impedance matching, frequency mixing, up or down frequency conversion, filtering, amplifying, and so like. The (A/D)/(D/A) converter 254 is configured to convert from an analog signal format to a digital signal format during uplink signal processing and from a digital signal format to an analog signal format during downlink signal processing. The processing module 256 is configured to process digital signal and to perform procedures of the proposed proximity discovery method described in the following in accordance with exemplary embodiments of the present disclosure. Also, the processing module 256 may optionally be coupled to a non-transitory memory module 255 to store programming codes, device configurations, a codebook, buffered or permanent data, and so forth.

The functions of the processing module 256 could be implemented by using programmable units such as a microprocessor, a micro-controller, a DSP chips, FPGA, etc. The processing module 256 may further contain a cellular network module such as a LTE module optionally combined with 3G and/or 2G module and a wireless local network module (not shown) such as a Wi-Fi module. The cellular network module would support LTE-U. That means the cellular network module would convert a digital message into a format that is compatible with LTE-U protocol, and could access the cellular network such as LTE-U network. The wireless local network module would support 802.11ac. That means the wireless local network module would convert a digital message into a format that is compatible with 802.11 ac protocol, and could access the wireless local network such as Wi-Fi network. The functions of the processing module 256 may also be implemented with separate electronic devices or ICs, and the functions performed by the processing module 256 may be implemented within the domain of either hardware or software.

Figure 6:
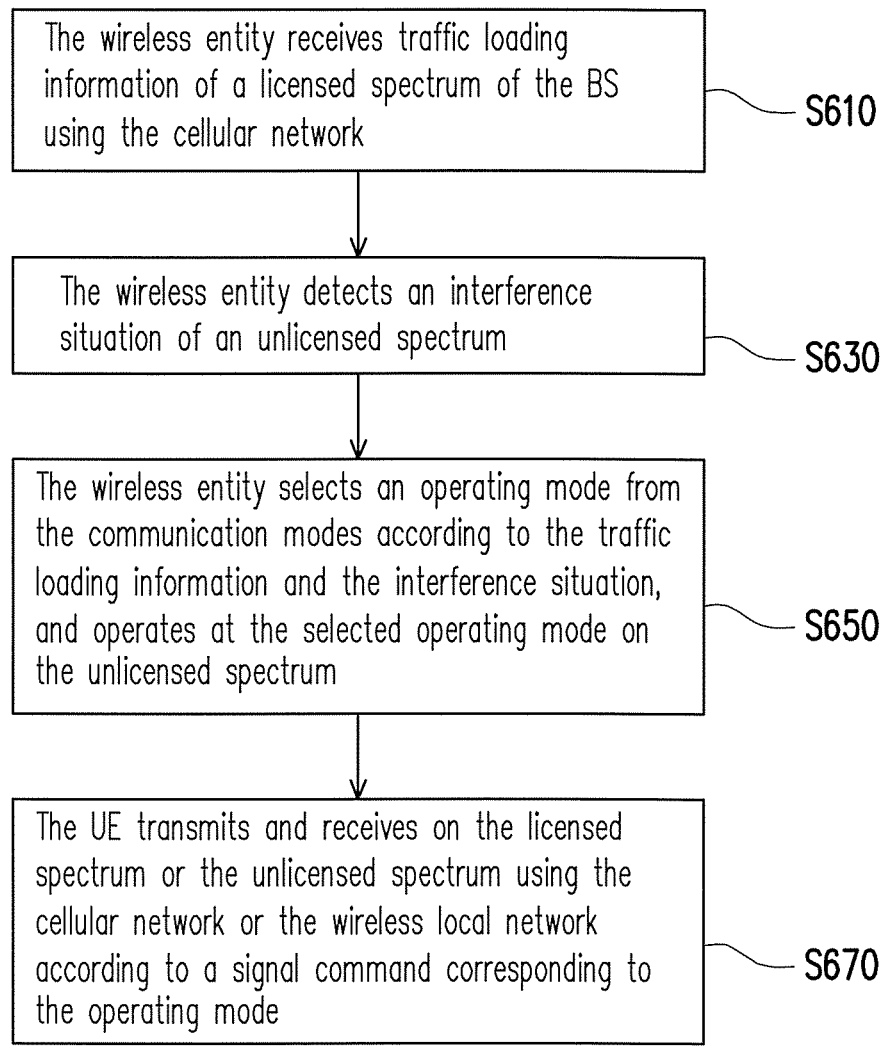
FIG. 6 is a flow chart illustrating method of controlling communication modes for the communication system in accordance with an embodiment of the present disclosure.

FIG. 6 is a flow chart illustrating method of controlling communication modes for the communication system 200 in accordance with an embodiment of the present disclosure. In step S610, the processing module 236 of the wireless entity 230 may receive traffic loading information of a licensed spectrum of the BS 210 using the cellular network through backhaul module 236_1. In this embodiment, the traffic loading information may be corresponding to at least one of or a combination of parameters but not limited to the number of UEs 250 connected with the BS 210, a loading quantification value indicating the traffic loading indication, the number of the random access attempting in the BS 210, a total traffic volume in the BS 210 during a period of time, and request throughput information from the UEs during a period of time. However, it is apparent for an ordinary person skilled in the art that the traffic loading information could also be other status information of the BS 210 using the cellular network on licensed spectrum, and the present disclosure is not limited to the specific types of traffic loading information.

The traffic loading information is one of the judging conditions of switching communication mode criteria, and it would help the wireless entity 230 to know the traffic loading of the BS 210. For example, there may be 500 UEs served by the BS 210 within the service coverage area 219 of the BS 210, the wireless entity 230 would know that the traffic loading of the BS 210 is heavy after receiving the traffic loading information.

In step S630, the processing module 236 of the wireless entity 230 may detect an interference situation of an unlicensed spectrum. In this embodiment, the interference situation is information acquired through the receiving module 233 and the antenna units 232 operated at the unlicensed spectrum such as 5 GHz, and may be corresponding to at least one of or a combination of parameters but not limited to signal strength for each bands in the unlicensed spectrum, a sum of the received signal strengths for all bands in the unlicensed spectrum, the number of the identified entities operating at the unlicensed spectrum, and a interference quantification value indicating a interference indication. However, it is apparent for an ordinary person skilled in the art that the interference situation could also be other status information of the unlicensed spectrum, and the present disclosure is not limited to the specific types of interference situation.

The interference situation is another one of the judging conditions of switching communication mode criteria, and it would help the wireless entity 230 to know a usage of the unlicensed spectrum. For example, an interference situation may indicate that only 10 UEs are operating at 5 GHz within the service coverage area 239 of the wireless entity 230.

In step S650, the processing module 236 of the wireless entity 230 may select an operating mode from the communication modes according to the traffic loading information and the interference situation, and operate at the selected operating mode on the unlicensed spectrum. In this embodiment, the processing module 236 of the wireless entity 230 may compare a traffic loading indication for the traffic loading information with traffic loading thresholds, compare an interference indication for the interference situation with interference thresholds, and receive performance statistics of the UE 250 in which the wireless entity 230 is operated at the selected operating mode through the receiving module 233 or the backhaul module 236_1. Then, the UEs 250 may transmit and receive on the licensed spectrum or the unlicensed spectrum using the cellular network or the wireless local network according to a signal command corresponding to the operating mode received from the BS 210 (S670).

Figure 7:
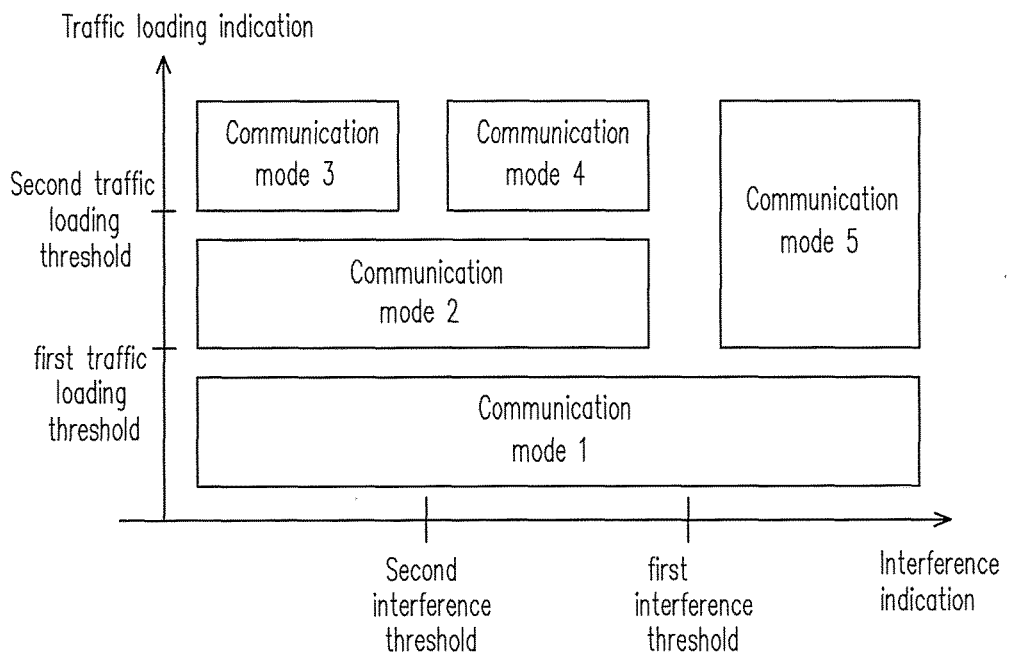
FIG. 7 is a schematic diagram illustrating the communication modes of the wireless entity according to the traffic loading information and the interference situation in accordance with an embodiment of the present disclosure.

FIG. 7 is a schematic diagram illustrating the communication modes of the wireless entity 230 according to the traffic loading information and the interference situation in accordance with an embodiment of the present disclosure. Referring to FIG. 7, there are five communication modes, the wireless entity 230 would switch communication mode according to the traffic loading infoiniation and the interference situation.

In one embodiment of the present disclosure, the processing module 236 of the wireless entity 230 may disable to transmit and receive using the cellular network and the wireless local network upon unlicensed spectrum in response to the traffic loading indication being smaller than a first traffic loading threshold of the traffic loading thresholds.

Specifically, for the communication mode 1, when the traffic loading indication is below the first traffic loading threshold at a particular time (such as at midnight), the processing module 236 may decide to turn off the cellular network module 236_3 such as LTE chip and the wireless local network module 236_5 such as Wi-Fi chip simultaneously. Only backhaul module 236_1 would be active to receive any traffic loading information (such as the traffic loading changes from low to high) regarding with the BS 210 via wire-line or wireless interface. It should be noticed that the transmitting module 231 and the receiving module 233 could be switched off to save operation power. Under the communication mode 1, the UEs 250 are not aware of the wireless entity 230 and could be served by BS 210 on the licensed spectrum through cellular-based air interface such as LTE air interface. It is further noted that a timer could be applied whereas only the satisfied event (e.g., traffic load falls below a threshold) continues for a while (e.g., the timer expires), then the switch off would be exercised.

On the other hand, in the view of the UEs 250, the processing module 256 of the UE 250 would receive a signal command from the BS 210 through the receiving module 253. The signal command indicates the operating mode of using the cellular network and the wireless local network. In other words, the UEs 250 would be informed what operating mode the wireless entity 230 is used. In the communication mode 1, the UE 250 may be requested to transmit a measurement report of the unlicensed spectrum to the BS 210 according to the signal command. For example, a UE is requested to make a Radio Resource Management (RRM) measurement.

In one embodiment of the present disclosure, the processing module 236 of the wireless entity 230 may transmit and receive on the unlicensed spectrum using the wireless local network in response to the traffic loading indication being larger than the first traffic loading threshold of the traffic loading thresholds and smaller than the second traffic loading threshold of the traffic loading thresholds and the interference indication being smaller than the first interference threshold of the interference thresholds.

Specifically, for the communication mode 2, when the traffic loading indication is medium (i.e., between the first traffic loading threshold and the second traffic loading threshold) and interference indication is not too high (i.e., smaller than the first interference threshold), the processing module 236 may turn on the wireless local network module 236_5 such as Wi-Fi chip and turn off the cellular network module 236_3 such as LTE chip. This is because Wi-Fi could have the similar performance with LTE-U while loading is not high but it consumes less power as well. Therefore, the wireless entity 230 would become a traditional Wi-Fi module (i.e., Access Point) under the communication mode 2, and the BS 210 would transmit signaling indications (i.e., a recommend steering criteria) to the UEs 250 for traffic offloading to Wi-Fi. The BS 210 may further give signaling indications to its serving UEs 250 to search the wireless entity 230 by Access Network Discovery and Selection Function (ANDSF)/Radio Access Network (RAN) rules or other Wi-Fi searching protocol. Notice that the BS may give such command (e.g., in order to notify the existence of WLAN AP) but it still rely on UE's preference to decide whether the traffic is offloaded to Wi-Fi or not.

If an UE 250 reports a strong received signal strength from the wireless entity 230, the UE 250 could perform traffic steering or inter-RAT handover (HO) to let it served by wireless entity 230 (via Wi-Fi protocol). In the communication mode 2, the BS 210 may configure the UEs 250 to measure Wi-Fi and to report the Wi-Fi status. The UEs 250 may measure the Wi-Fi radio link quality and collect the congestion statistics. Then, the UEs 250 may report the Wi-Fi status to the BS 210. Note that the Wi-Fi status may include Wi-Fi signaling quality, the number of contention failure in a pre-defined or configured time period, the preference of using Wi-Fi from UE higher layer perspective such as Yes or No, and the amount of uplink (UL) data stored in a Wi-Fi buffer of the UE 250. The reporting may be periodical or event triggered. The event may be the Wi-Fi signaling quality below a quality threshold, the number of contention failure exceeding a threshold or the amount of UL data exceeding a threshold or the preference changes.

In one embodiment of the present disclosure, the processing module 236 of the wireless entity 230 may transmit and receive on the unlicensed spectrum using the cellular network with a contention-based mechanism in response to a compared result of the traffic loading indication and the interference indication (i.e., the compared result is the traffic loading indication being larger than the second traffic loading threshold of the traffic loading thresholds and the interference indication is smaller than the first interference threshold of the interference threshold.

Specifically, for the communication mode 3, when the traffic loading indication is high (i.e., exceed the second traffic loading threshold) but interference indication is low (i.e., smaller than the first interference threshold). For example, it refers there are a lot of UEs 250 but less other operators' entities), the processing module 236 may turn on the cellular network module 236_3 with the LBT module 236_7 to provide LTE-U feature and turn off the wireless local network module 236_5. This is because LTE-U could provide good centralized controls and scheduling to prevent self-UE contention amongst same operator and the capacity could be utilized under the communication mode 3 as comparing with the communication mode 2. The BS 210 could request the UEs 250 to perform RRM measurement for verifying whether the UE 250 is under LTE-U coverage such as the service coverage area 239.

Under communication mode 3, the LTE-U will broadcast reference signal upon the unlicensed spectrum. If the UE 250 reports that the received signal exceeds a signal strength threshold, then the UE 250 would activate a component carrier on the unlicensed spectrum for the UE 250 to use the cellular network according to the signal command. For example, if the UE 250 detects strong Reference signal receive quality (RSRQ)/Reference signal receiving quality (RSRQ), the BS 210 could activate the LTE-U Component Carrier (CC) for that corresponding UE 250. From UE 250 point of view, it is served by the BS 210 and the wireless entity 230 through carrier aggregation (CA) mechanism where the BS 210 acts as primary CC to provide control signaling and wireless entity 230 acts as secondary CC to provide data. The BS 210 may request the UE 250 to turn on Wi-Fi to measure the interference or the loading which is resulted from other Wi-Fi devices. Then, UE 250 may report this measurement results to the BS 210. The measurement results may include the information in the Beacon which is sent by other Wi-Fi APs.

In one embodiment of the present disclosure, the processing module 236 of the wireless entity 230 may transmit and receive on the unlicensed spectrum using the cellular network with the contention-based mechanism and the interference mitigating mechanism in response to the compared result of the traffic loading indication and the interference indication (i.e., the compared result is the traffic loading indication is larger than the second traffic loading threshold of the traffic loading thresholds and the interference indication is larger than the first interference threshold of the interference thresholds and smaller than the second interference threshold of the interference thresholds). Then, the processing module 256 of the UE 250 may perform the interference mitigating mechanism according to the signal command.

Specifically, for the communication mode 4, when the traffic loading indication is high (i.e., exceeds the second traffic loading threshold) and interference temperature is not low (between the first and second interference threshold), the processing module 236 may turn on the cellular network module 236_3 with the LBT module 236_7 and the IM module 236_9 to provide LTE-U feature and turn off the wireless local network module 236_5. By using the IM module 236_9, it allows LTE-U could make transmission even when the LBT module 236_7 detects that there exists an entity using the unlicensed spectrum. Similar to the communication mode 3, the BS 210 would request the UE 250 to perform RRM measurement. Moreover, the BS 210 may notify the UE 250 what IM mechanism the wireless entity adopts and assist UE 250 to perform accurate measurement. The detail description of IM mechanism could refer to the description of the IM module 236_9 in the FIG. 4, and thus a repetition of descriptions will not be repeated.

Due to the IM mechanism, the BS 210 may further select a specific UE 250 to be served by the wireless entity 230. For example, the BS 210 only requests the UE 250 with low speed to perform LTE-U RRM measurement. The BS 210 may request the UE 250 to turn on Wi-Fi to measure the interference or the loading which is resulted from other Wi-Fi devices. Then, UE may report this measurement results to the BS 210. The measurement results may include the information in the Beacon which is sent by other Wi-Fi APs.

In one embodiment of the present disclosure, the processing module 236 of the wireless entity 230 may contend on the unlicensed spectrum using the wireless local network, and transmit and receive on the unlicensed spectrum using the cellular network and the wireless local network after granting resource of the unlicensed spectrum in response to the compared result being that the traffic loading indication being larger than the second traffic loading threshold of the traffic loading thresholds and the interference indication being larger than the second interference threshold of the interference thresholds. Then, the processing module 256 of the UE 250 may receive a signaling message at a scheduled time according to the signal command.

Specifically, for the communication mode 5, when the traffic loading indication is not low (i.e., exceeds the second traffic loading threshold) but interference temperature is high (i.e., exceeds the second interference threshold), the processing module 236 may turn on the cellular network module 236_3 and the wireless local network module 236_5 together. The processing module 236 may contend on the unlicensed spectrum using the wireless local network, and transmit and receive on the unlicensed spectrum using the cellular network after granting resource of the unlicensed spectrum. For example, the wireless entity 230 employ Wi-Fi chip to content the unlicensed spectrum. After the resources are granted, the wireless entity 230 would employ LTE chip to provide LTE-U transmission. The reason is that Wi-Fi protocol has small timing granularity and able to grant the resources successfully as comparing with using LTE protocol. After granting the resources, the BS 210 may request UE 250 to perform LTE-U RRM measurement. Note that the activation of Wi-Fi chip is transparent to UE 250. Under this communication mode 5, it allows the BS 210 to offload the high traffic loading to the unlicensed spectrum even though there are a lot of contentions from other operators. It is noticed that LTE chip could further implement with the LBT module 236_7 without cooperating with Wi-Fi, thus the power consumption of the wireless entity 230 may be reduced (no inter-modem information negotiation is required).

It should be noticed that wireless entity 230 can switch the operating mode from one communication mode to another based on the specific criteria. The wireless entity 230 may be also required to negotiate with the BS 210 about its adopted communication mode and specific criteria. On the other hand, UE 250 reports preference statistics of the communication modes to the BS 210, and the BS 210 makes a decision of the communication modes according to the preference statistics. In other words, the UE 250 may indicate what communication mode it prefers and the wireless entity 230 may make the communication mode decision based on the collected UE feedback. Finally, the wireless entity 230 may receive UE 250 capability from the BS 210 and decides whether or not to turn on the LTE chip with the LBT module 236_7 based on the number of the UEs 250 supporting LTE-U.

From UE 250 perspective, the required efforts amongst switching communication modes comprise several examples, and their descriptions would be introduced as following.

One of embodiments of the present disclosure involves switching from the communication mode 1 to the communication mode 2. There may be two alternatives. The first alternative is that, UE 250 could always performs Wi-Fi search regardless of the wireless entity 230 operating modes and it could quickly utilize Wi-Fi while the wireless entity 230 switches from the communication mode 1 to the communication mode 2 without any network assistance. The second alternative is that, UE 250 only initiates Wi-Fi search when receiving negotiation from network and the UE 250 may also terminate the Wi-Fi search when receiving another negotiation (when the wireless entity 230 is not in the communication mode 2).

Figure 8:
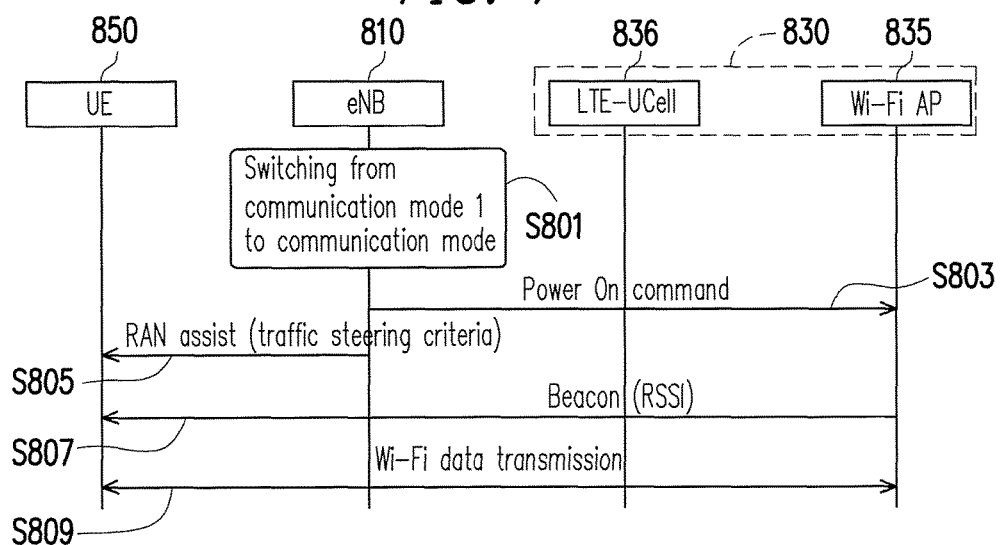
FIG. 8 illustrates an example of switching the communication modes.

FIG. 8 illustrates an example of switching the communication modes. In step S801, eNB 810 decides to switch from the communication mode 1 to the communication mode 2. The CLW 830 may receive a power on command to turn a Wi-Fi chip, and the CLW 830 would be treated as a Wi-Fi AP 835 (S803). The eNB 810 may transmit RAN assist information that specifies what criteria the UE 850 can initiate the traffic steering from LTE to Wi-Fi (S805). Then, the Wi-Fi AP 835 would send a Beacon signal and the UE 850 can perform Received Signal Strength Indication (RSSI) measurement (S807). Subsequently, the UE 850 would perform Wi-Fi data transmission with the Wi-Fi AP 835 when the RSSI is sufficiently good (S809).

One of embodiments of the present disclosure involves switching from the communication mode 2 to the communication mode 1. The network may inform UE 250 that Wi-Fi operation is terminated and stop the transmission/reception on the unlicensed spectrum. Alternatively, the network may not make such negotiation and the UE 250 may recognize Wi-Fi quality is bad (for example, be treated as out of Wi-Fi coverage) and consequently only access with the BS 230.

One of embodiments of the present disclosure involves switching from the communication mode 1 to the communication mode 3, from the communication mode 1 to the communication mode 4, or from the communication mode 1 to the communication mode 5. The listed switching is the same from UE 250 point of view and the UE 250 is requested to make RRM measurement with respect to the unlicensed band and consequently activate/deactivate the LTE-U CC.

One of embodiments of the present disclosure involves switching from the communication mode 3 to the communication mode 1, from the communication mode 4 to the communication mode 1, or from the communication mode 5 to the communication mode 1. The BS 210 can deactivate the LTE-U CC or further release the CC configurations on the unlicensed spectrum. Afterwards, the UE 250 is only access with the BS 210 on licensed spectrum.

On of embodiments of the present disclosure involves switching from the communication mode 2 to the communication mode 3 or from the communication mode 2 to the communication mode 4. In the communication mode 2, the BS 210 may configure UE 250 to measure Wi-Fi and to report the Wi-Fi status. UE 250 may measure the Wi-Fi radio link quality and collect the congestion statistics. Then, UE 250 may report the Wi-Fi status to the BS 210. Note that the Wi-Fi status may include Wi-Fi signaling quality, the number of contention failure in a pre-defined or configured time period, and the amount of UL data stored in the Wi-Fi buffer of UE 250. The reporting may be periodical or event triggered. The event may be the Wi-Fi signaling quality below a threshold, the number of contention failure exceeding a threshold or the amount of UL data exceeding a threshold. UE 250 may terminate its Wi-Fi module and wait for the signaling command from the BS 210 to activate the LTE-U CC. The BS 210 could request the UE 250 to initiate RRM measurement on LTE-U. The BS 210 may explicitly indicate UE 250 to turn off Wi-Fi by a dedicated signaling or implicitly request UE 250 to turn off Wi-Fi by requesting UE 250 to activate the LTE-U CC. Therefore, UE 250 may implicitly terminate the Wi-Fi module after receiving the request. Alternatively, the BS 210 may acquire link information from WLAN AP and omit RRM measurement (take Wi-Fi performance as a reference for RRM decision). Afterwards, the BS 210 could activate LTE-U transmission and UE 250 may terminate the Wi-Fi module consequently (It is noted that there is activation delay e.g., 8 ms and UE 250 shall be able to turn off the Wi-Fi module as well).

Figure 9:
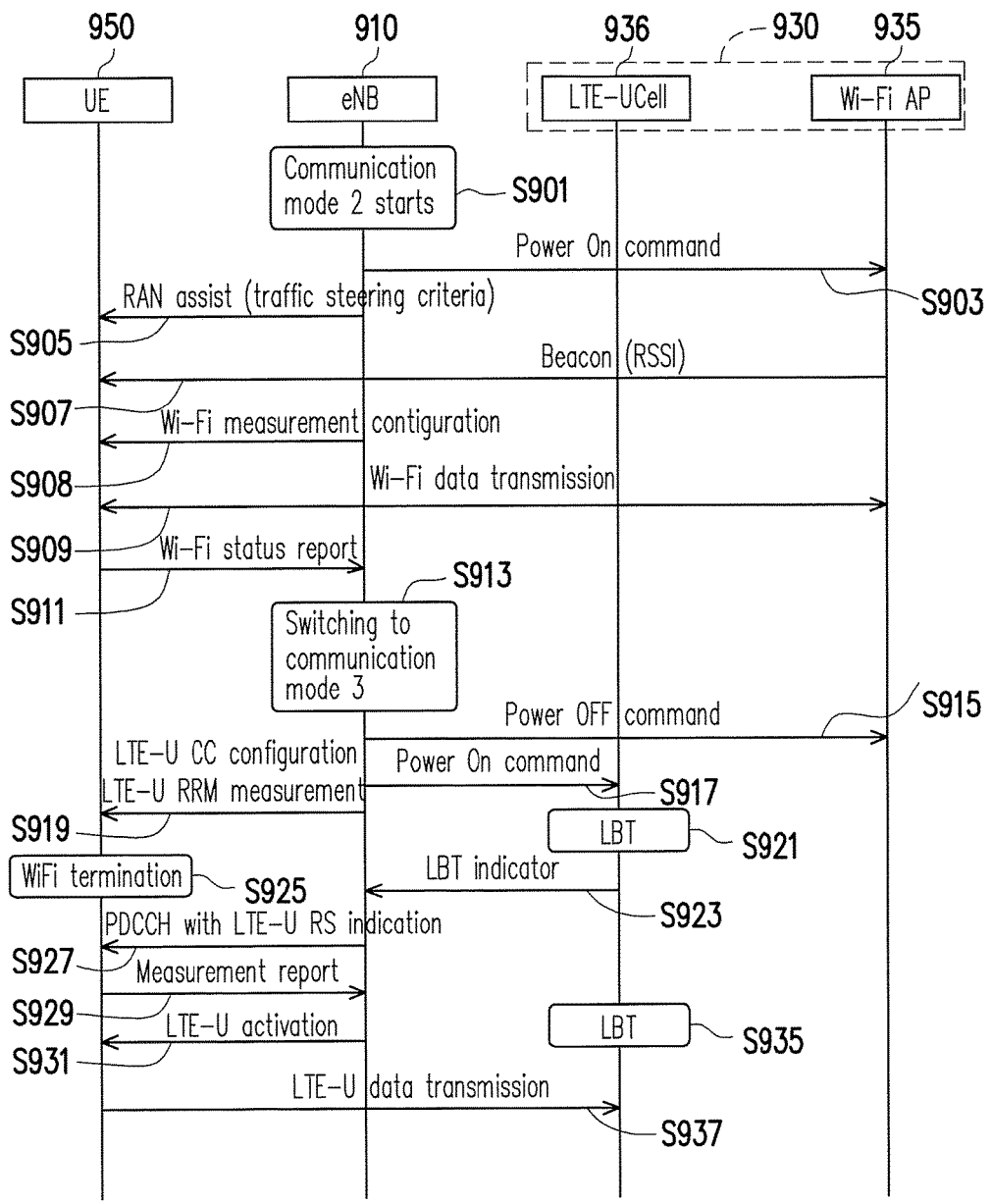
FIG. 9 is an example of the switching communication modes.

FIG. 9 is an example of the switching communication modes. Referring to FIG. 9, the detail description of step S901~S909 could be referred to the step S801~S809 in FIG. 8, and thus details thereof are not repeated. In step S908, UE 950 would receive a Wi-Fi measurement configuration from eNB 910, and then UE 950 may transmit a Wi-Fi status report of Wi-Fi AP 935 to eNB 910 (S911). eNB 910 would determine that the operating mode should be switched to the communication mode 3 (S913), and eNB 910 may signaling power on and power off commands to LTE-U cell 936 (S915) and Wi-Fi AP 935 (S917) of CLW 930, respectively. Then, eNB 910 would further transmit LTE-U CC configuration and LTE-U RRM measurement configuration to UE 950 (S919), and UE 950 may terminate the Wi-Fi transmission while receiving RRM measurement configuration toward unlicensed spectrum (S925). The CLW 930 may further turn on the LBT function (S921), and transmit a LBT indicator to eNB 910 (S923) when the unlicensed spectrum was available for transmission. Then, eNB 910 would transmit a LTE-U Reference signal (RS) indication on Physical Downlink Control Channel (PDCCH) to UE 950 (S927). UE 950 may transmit measurement report to eNB 910 (S929), and eNB 910 may transmit LTE-U activation indication to UE 950. Subsequently, the LTE-U cell 936 performs the LBT function (S935), and UE 950 may perform LTE-U data transmission with LTE-U cell 936 (S937).

One of embodiments of the present disclosure involves switching from the communication mode 3 to the communication mode 2, the BS 210 may indicate UE 250 to turn on Wi-Fi module based on the UE 250 measurement report and the loading on LTE-U and/or LTE. The BS 210 may steer the traffic from LTE to Wi-Fi.

One of embodiments of the present disclosure involves switching from the communication mode 4 to the communication mode 2, the BS 210 may indicate UE 250 to turn on Wi-Fi module based on the UE 250 measurement report and the loading on LTE-U and/or LTE. The BS 210 may steer the traffic from LTE to Wi-Fi.

One of embodiments of the present disclosure involves switching from the communication mode 2 to the communication mode 5, UE 250 may get confusion under such switching. This is because both the operation of the wireless local network module 236_5 and the cellular network module 236_3 is on-going under the communication mode 5 but UE 250 is only subjected to make transmission via LTE-U. Therefore, UE 250 may disable to access the wireless local network according to the signal command. For example, a signaling command from the BS 210 is required to prohibit UE 250 to access via Wi-Fi (e.g., a prohibit timer could be used). In addition, the signaling command may indicate UE 250 to steer the traffic to LTE system.

One of embodiments of the present disclosure involves switching from the communication mode 5 to the communication mode 2, the BS 210 deactivate LTE-U CC or release the CC configuration. Meanwhile, the BS 210 can request UE 250 to perform measurements toward Wi-Fi (beacon RSSI). Therefore, the UE 250 is able to operate at unlicensed spectrum through Wi-Fi operation.

One of embodiments of the present disclosure is from the communication mode 3 to the communication mode 4, under this switching of the communication modes, due to interference mitigation mechanism, the LTE-U transmission may be restricted (e.g., UE 250 is only admitted to make transmission at specific sub-frames if TDM approach is used). The BS 210 needs to signal the coordination results to let UE 250 operate with accurate approach (e.g., the power control mechanism, the time division mechanism, the frequency division mechanism, and the dynamic frequency hopping mechanism). For example, while a time pattern is signaled UE 250 consequently measures RS based on this time pattern.

One of embodiments of the present disclosure involves switching from the communication mode 4 to the communication mode 3, the BS 210 would release/remove the IM configuration (e.g., time pattern) and UE 250 is able to operate at the communication mode 3 without any transmission restriction.

Figure 10:
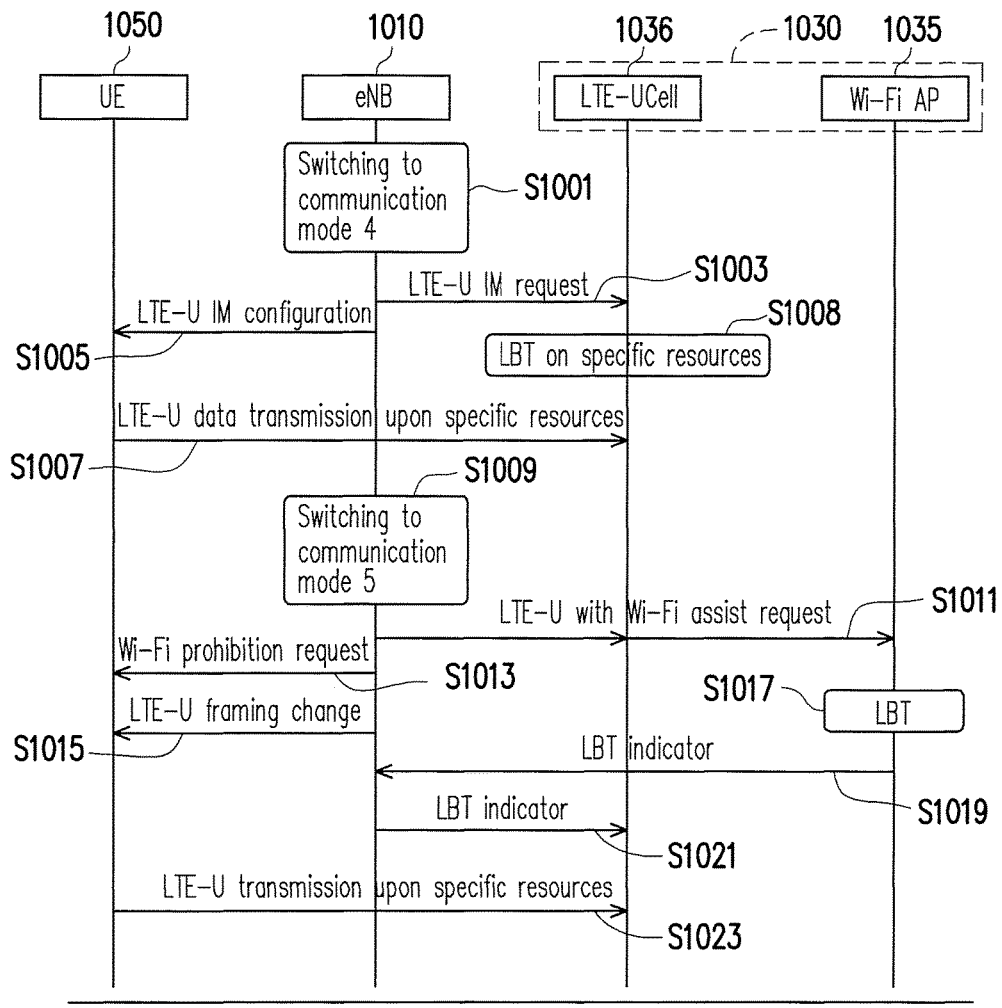
FIG. 10 is an example of the switching communication modes.

One of embodiments of the present disclosure involves switching from the communication mode 3 to the communication mode 5 or from the communication mode 4 to the communication mode 5, the frame structure (e.g., timing) may be changed when introducing the communication mode 5. FIG. 10 is an example of the switching the communication modes. Referring to FIG. 10, in step S1001, eNB 1010 determines to switch the operating mode to the communication mode 4. Then, the eNB 1010 may transmit LTE-U IM request to LTE-U cell 1036 of the CLW 1030 (S1003), and transmit LTE-U IM configuration to UE 1050 (S1005). Subsequently, LTE-U cell 1036 would perform LBT function on specific resources (such as timing or frequency band) (S1008), and UE 1050 would perform LTE-U data transmission upon the specific resources with LTE-U cell 1036. In step S1009, eNB 1010 determines switch the operating mode to the communication mode 5. Then, the eNB 1010 may initiate LTE-U with sending Wi-Fi assist request message to Wi-Fi AP 1035 of the CLW 1030 (S1011), and transmit Wi-Fi prohibition request to UE 1050 (S1013). Subsequently, the eNB 1010 would transmit LTE-U framing change indication (S1015), to inform UE 1050 the proper timing to receive scheduling signaling or whether cross-subframe scheduling (with regard to the time offset) is used. Afterwards, UE 1050 will apply the new frame parameters (e.g., timing) to operate with LTE-U module and perform LTE-U data transmission upon the specific resources with LTE-U cell 1036 (S1023).

One of embodiments of the present disclosure involves switching from the communication mode 5 to the communication mode 3 or from the communication mode 5 to the communication mode 4, the BS 210 would notify a normal LTE-U frame parameters are used and the UE 250 can follow the LTE frame boundary to transmit/receive data on unlicensed spectrum.

In addition, when performing UE capability negotiation with the BS 210, if UE 250 indicates that both Wi-Fi and LTE-U operations are supporting, the BS 210 may inform there is a co-located the wireless entity 230 such as CLW in its coverage and the UE 250 is configured to further provide it preference about the working modes. For example, UE 250 can send UE assistance information with 3 bits to indicate what communication mode it preferred (e.g., bit "1"=communication mode 1 is preferred). After receiving the preferences, the BS 210 can decide what operating mode the wireless entity 230 will operate. It should be noted that a prohibit timer could be further assigned to prevent frequent preference indications (i.e., the timer will start when sending UE preference, and UE 250 is prohibited to send UE preference until timer expiring). The communication mode preference of the wireless entity 230 may be kept in Mobility Management Entity (MME) and the target BS 210 can acquire the information for incoming UEs 250. Another alternative is UE 250 can just indicate its preference (1 bit) on concurrent operating modes. For instance, bit "1" is used for indicating the concurrent operating mode is preferred; otherwise bit "0" refers the operating mode is not proper from the UE 250 perspective and the BS 210 may change the operating mode when most of UEs 250 not prefer the concurrent operating modes.

Figure 11:
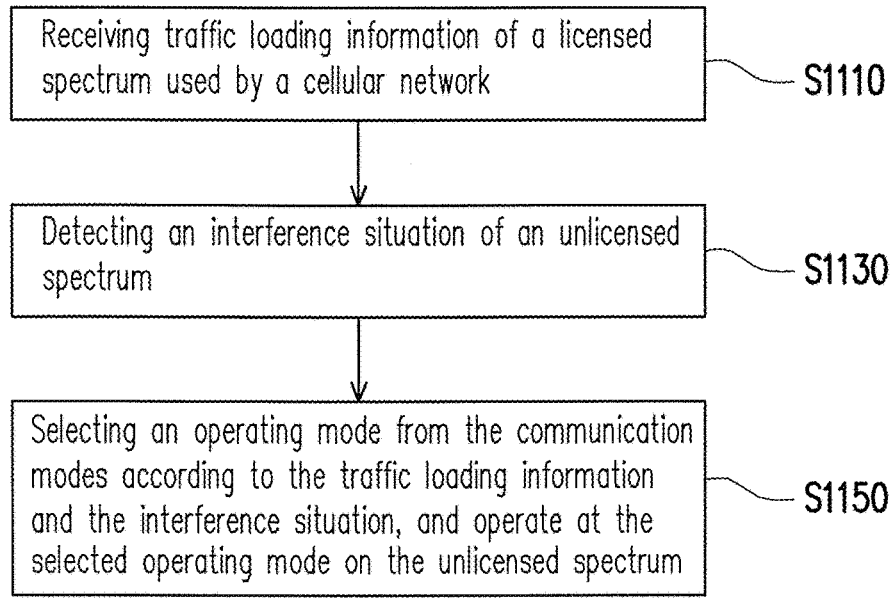
FIG. 11 is a flow chart illustrating method of controlling communication modes for the wireless entity in accordance with an embodiment of the present disclosure.

On the other hand, in one of the exemplary embodiments, the disclosure is directed to a method of controlling communication modes used by the wireless entity 230. FIG. 11 is a flow chart illustrating method of controlling communication modes for the wireless entity 230 in accordance with an embodiment of the present disclosure. In step S1110, the wireless entity 230 may receive traffic loading information of a licensed spectrum used by a cellular network. Then, the wireless entity 230 may detect an interference situation of an unlicensed spectrum (S1130). Subsequently, the wireless entity 230 may select an operating mode from the communication modes according to the traffic loading information and the interference situation, and operate at the selected operating mode on the unlicensed spectrum (S1150).

Figure 12:
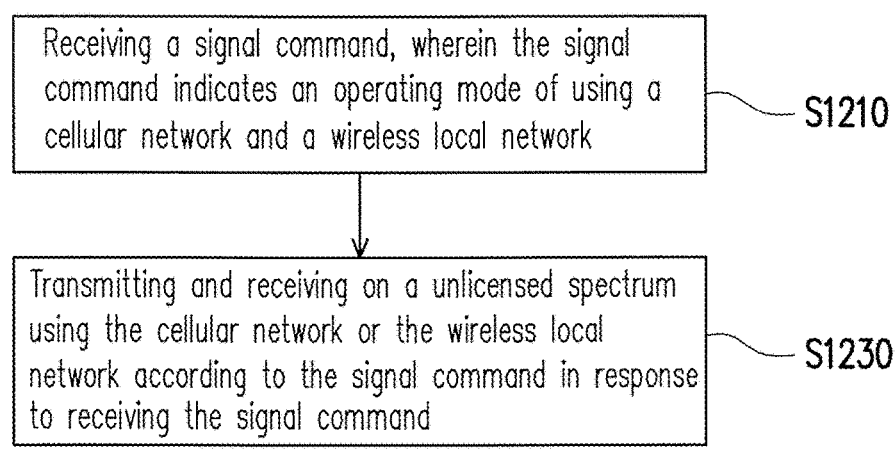
FIG. 12 is a flow chart illustrating method of controlling communication modes for the UE in accordance with an embodiment of the present disclosure.

In one of the exemplary embodiments, the disclosure is directed to a method of controlling communication modes used by the UE 250. FIG. 12 is a flow chart illustrating method of controlling communication modes for the UE 250 in accordance with an embodiment of the present disclosure. In step S1210, the UE 250 may receive a signal command, wherein the signal command indicates an operating mode of using a cellular network and a wireless local network. Then, the UE 250 may transmit and receive on an unlicensed spectrum using the cellular network or the wireless local network according to the signal command in response to receiving the signal command (S1230).

In view of the aforementioned descriptions, the disclosure is related to a method of controlling communication modes for a wireless entity and a UE, and a communication system using the same method. The wireless entity may provide Wi-Fi protocol and/or LTE protocol, selectively. Wi-Fi system of the wireless entity is turned off while traffic loading is high. LTE system of the wireless entity would be turned off while traffic loading is low. Therefore, a coordination mechanism or a new architecture is proposed in this disclosure, to let the operator could utilize the unlicensed spectrum in efficient way.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:
1. A method of controlling communication modes used by a wireless entity, the method comprising:
receiving traffic loading information of a licensed spectrum used by a cellular network;

detecting an interference situation of an unlicensed spectrum; and selecting an operating mode from the communication modes according to the traffic loading information and the interference situation, which comprises:
comparing a traffic loading indication for the traffic loading information with traffic loading thresholds;
comparing an interference indication for the interference situation with interference thresholds; and
receiving performance statistics of user equipments (UEs) in which the wireless entity is operated at the selected operating mode; and operating the wireless entity under the selected operating mode on the unlicensed spectrum by transmitting and receiving on the unlicensed spectrum using either one of the cellular network and a wireless local network or the combination of the cellular network and the wireless local network based on a compared result of the traffic loading indication and the interference indication and the performance statistics of the UEs.

2. The method of claim 1, wherein determining transmitting and receiving on the unlicensed spectrum using the cellular network, the wireless local network, or the cellular network and the wireless local network comprising:
transmitting and receiving on the unlicensed spectrum using the cellular network with a contention-based mechanism in response to the compared result being that the traffic loading indication being larger than a second traffic loading threshold of the traffic loading thresholds and the interference indication being smaller than a first interference threshold of the interference thresholds.

3. The method of claim 1, wherein determining transmitting and receiving on the unlicensed spectrum using the cellular network, the wireless local network, or the cellular network and the wireless local network comprising:
contending on the unlicensed spectrum using the wireless local network; and
transmitting and receiving on the unlicensed spectrum using the cellular network after granting resource of the unlicensed spectrum in response to the compared result being that the traffic loading indication being larger than a second traffic loading threshold of the traffic loading thresholds and the interference indication being larger than a second interference threshold of the interference thresholds.

4. The method of claim 1, wherein transmitting and receiving on the unlicensed spectrum using the cellular network, the wireless local network, or the cellular network and the wireless local network comprising:
disabling the transmitting and receiving using the cellular network and the wireless local network in response to the traffic loading indication being smaller than a first traffic loading threshold of the traffic loading thresholds.

5. The method of claim 1, wherein determining transmitting and receiving on the unlicensed spectrum using the cellular network, the wireless local network, or the cellular network and the wireless local network comprising:
transmitting and receiving on the unlicensed spectrum using the wireless local network in response to the traffic loading indication being larger than a first traffic loading threshold of the traffic loading thresholds and smaller than a second traffic loading threshold of the traffic loading thresholds and the interference indication being smaller than a first interference threshold of the interference thresholds.

6. The method of claim 1, wherein determining transmitting and receiving on the unlicensed spectrum using the cellular network, the wireless local network, or the cellular network and the wireless local network comprising:
transmitting and receiving on the unlicensed spectrum using the cellular network with a contention-based mechanism and an interference mitigating mechanism in response to the traffic loading indication being larger than a second traffic loading threshold of the traffic loading thresholds and the interference indication being larger than a first interference threshold of the interference thresholds and smaller than a second interference threshold of the interference thresholds.

7. The method of claim 6, wherein the interference mitigating mechanism comprises a power control mechanism, a time division mechanism, a frequency division mechanism, and a dynamic frequency hopping mechanism.

8. A method of controlling communication modes used by a UE, the method comprising:
receiving a signal command, wherein the signal command is associated with a traffic loading information of a licensed spectrum and an interference situation of an unlicensed spectrum and indicates an operating mode of using a cellular network and a wireless local network; and
transmitting and receiving on a licensed spectrum or an unlicensed spectrum using the cellular network or the wireless local network according to the signal command in response to receiving the signal command.

9. The method of claim 8, wherein transmitting and receiving on the licensed spectrum or the unlicensed spectrum using the cellular network or the wireless local network according to the signal command in response to receiving the signal command comprising:
activating a component carrier on the unlicensed spectrum using the cellular network according to the signal command.

10. The method of claim 8, wherein transmitting and receiving on the licensed spectrum or the unlicensed spectrum using the cellular network or the wireless local network according to the signal command in response to receiving the signal command comprising:
transmitting a measurement report of the unlicensed spectrum according to the signal command.

11. The method of claim 8, wherein transmitting and receiving on the licensed spectrum or the unlicensed spectrum using the cellular network or the wireless local network according to the signal command in response to receiving the signal command comprising:
receiving a signaling message at a scheduled time according to the signal command.

12. The method of claim 8, wherein transmitting and receiving on the licensed spectrum or the unlicensed spectrum using the cellular network, the wireless local network, or the cellular network and the wireless local network according to the signal command in response to receiving the signal command comprising:
disabling to access the wireless local network according to the signal command.

13. A communication system comprising:
a UE;
a base station; and
a wireless entity, wherein the wireless entity receives traffic loading information of a licensed spectrum of the base station using a cellular network, the wireless entity detects an interference situation of an unlicensed spectrum, the wireless entity selects an operating mode from communication modes according to the traffic loading information and the interference situation by:

comparing a traffic loading indication for the traffic loading information with traffic loading thresholds, comparing an interference indication for the interference situation with interference thresholds, and receiving performance statistics of the UE in which the wireless entity is operated at the selected operating mode; and then the wireless entity operates at the selected operating mode on the unlicensed spectrum, and the UE transmits and receives on the licensed spectrum or the unlicensed spectrum using the cellular network or a wireless local network according to a signal command corresponding to the operating mode received from the base station, wherein the wireless entity transmits and receives on the unlicensed spectrum using either one of the cellular network and a wireless local network or the combination of the cellular network and the wireless local network based on a compared result of the traffic loading indication and the interference indication and the performance statistics of the UE.

14. The communication system of claim 13, wherein the wireless entity transmits and receives on the unlicensed spectrum using the cellular network with a contention-based mechanism in response to the compared result being that the traffic loading indication being larger than a second traffic loading threshold of the traffic loading thresholds and the interference indication being smaller than a first interference threshold of the interference thresholds.

15. The communication system of claim 13, wherein the wireless entity contends on the unlicensed spectrum using the wireless local network, and transmits and receives on the unlicensed spectrum using the cellular network after granting resource of the unlicensed spectrum in response to the compared result being that the traffic loading indication being larger than a second traffic loading threshold of the traffic loading thresholds and the interference indication being larger than a second interference threshold of the interference thresholds.

16. The communication system of claim 13, wherein the wireless entity disables to transmit and receive using the cellular network and the wireless local network in response to the traffic loading indication being smaller than a first traffic loading threshold of the traffic loading thresholds.

17. The communication system of claim 13, wherein the wireless entity transmits and receives on the unlicensed spectrum using the wireless local network in response to the traffic loading indication being larger than a first traffic loading threshold of the traffic loading thresholds and smaller than a second traffic loading threshold of the traffic loading thresholds and the interference indication being smaller than a first interference threshold of the interference thresholds.

18. The communication system of claim 13, wherein the wireless entity transmits and receives on the unlicensed spectrum using the cellular network with a contention-based mechanism and an interference mitigating mechanism in response to the traffic loading indication being larger than a second traffic loading threshold of the traffic loading thresholds and the interference indication being larger than a first interference threshold of the interference thresholds and smaller than a second interference threshold of the interference thresholds.

19. The communication system of claim 18, wherein the interference mitigating mechanism comprises a power control mechanism, a time division mechanism, a frequency division mechanism, and a dynamic frequency hopping mechanism.

20. The communication system of claim 13, wherein the signal command indicates the operating mode of using the cellular network and the wireless local network.

21. The communication system of claim 20, wherein the UE activates a component carrier on the unlicensed spectrum using the cellular network according to the signal command.

22. The communication system of claim 20, wherein the UE transmits a measurement report of the unlicensed spectrum to the base station according to the signal command.

23. The communication system of claim 20, wherein the UE receives a signaling message from the base station at a scheduled time according to the signal command.

24. The communication system of claim 20, wherein the UE disables to access the wireless local network according to the signal command.

25. The communication system of claim 16, wherein the base station requests the UE to search signals using the wireless local network, offload the UE in response to signal strengths of the signals being larger than a signal strength threshold.

26. The communication system of claim 13, wherein the UE reports preference statistics of the communication modes to the base station, and the base station makes a decision of the communication modes according to the preference statistics.

* * * * *